(12) United States Patent
Kubo et al.

(10) Patent No.: US 7,782,267 B2
(45) Date of Patent: Aug. 24, 2010

(54) ANTENNA COIL ANTENNA DEVICE

(75) Inventors: Hiroyuki Kubo, Kanazawa (JP);
Hiromitsu Ito, Hakusan (JP); Kuniaki Yosui, Kanazawa (JP); Kiyoyasu Sakurada, Sabae (JP); Masanori Kasai, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/417,686

(22) Filed: Apr. 3, 2009

(65) Prior Publication Data
US 2009/0189729 A1 Jul. 30, 2009

Related U.S. Application Data

(63) Continuation of application No. PCT/JP2007/066609, filed on Aug. 28, 2007.

(30) Foreign Application Priority Data

Nov. 2, 2006 (JP) .............................. 2006-298579

(51) Int. Cl.
*H01Q 1/00* (2006.01)
*H01Q 7/08* (2006.01)
*H01F 5/00* (2006.01)

(52) U.S. Cl. ..................... 343/787; 343/788; 336/200; 336/223

(58) Field of Classification Search ................. 336/200, 336/223, 232; 343/787, 788
See application file for complete search history.

(56) References Cited

U.S. PATENT DOCUMENTS

| 5,923,300 | A | 7/1999 | Mejia |
| 6,628,241 | B1 | 9/2003 | Fukushima et al. |
| 6,930,646 | B2* | 8/2005 | Yahata et al. ............... 343/718 |
| 7,495,625 | B2* | 2/2009 | Endo et al. .................. 343/788 |
| 2002/0113747 | A1* | 8/2002 | Tessier et al. ............... 343/787 |
| 2003/0107523 | A1* | 6/2003 | Yahata et al. ............... 343/787 |
| 2005/0078045 | A1 | 4/2005 | Sano |
| 2007/0001921 | A1* | 1/2007 | Takahashi et al. ........... 343/788 |
| 2008/0007473 | A1* | 1/2008 | Yosui et al. ................. 343/788 |

FOREIGN PATENT DOCUMENTS

| JP | 03-064105 A | 3/1991 |
| JP | 05-004325 Y2 | 2/1993 |

(Continued)

OTHER PUBLICATIONS

Official Communication issued in International Patent Application No. PCT/JP2007/066609, mailed on Oct. 23, 2007.

*Primary Examiner*—Anh T Mai
(74) *Attorney, Agent, or Firm*—Keating & Bennett, LLP

(57) ABSTRACT

A flexible substrate is wound around a magnetic core to define an antenna coil. A receiver coil including a first receiver coil portion and a second receiver coil portion which have opposite winding directions, and a transmitter coil including a first transmitter coil portion and a second transmitter coil portion which have opposite winding directions are provided on the flexible substrate. A region in which the receiver coil is provided and a region in which the transmitter coil is provided at least partially overlap each other when viewed in plan view, and non-coil-wound portions are provided between the first coil portions and second coil portions in the coils.

13 Claims, 12 Drawing Sheets

FOREIGN PATENT DOCUMENTS

| JP | 11-225097 A | 8/1999 |
|----|---|---|
| JP | 2001-085931 A | 3/2001 |
| JP | 2001-517406 A | 10/2001 |
| JP | 2003-264423 A | 9/2003 |
| JP | 2005-151431 A | 6/2005 |
| JP | 2006-138684 A | 6/2006 |

* cited by examiner

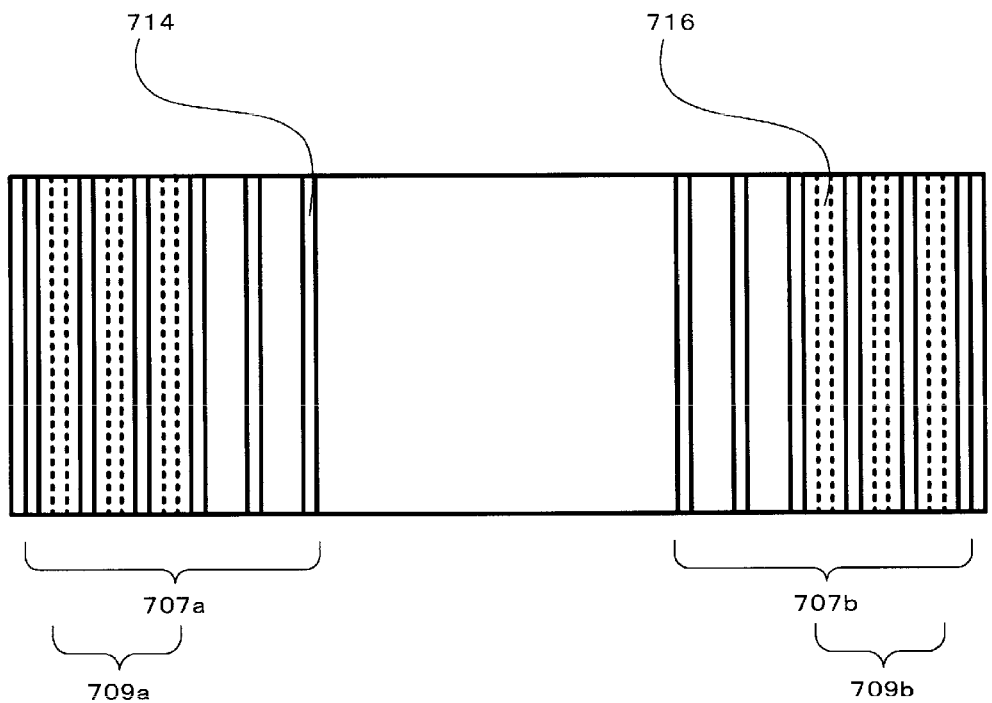
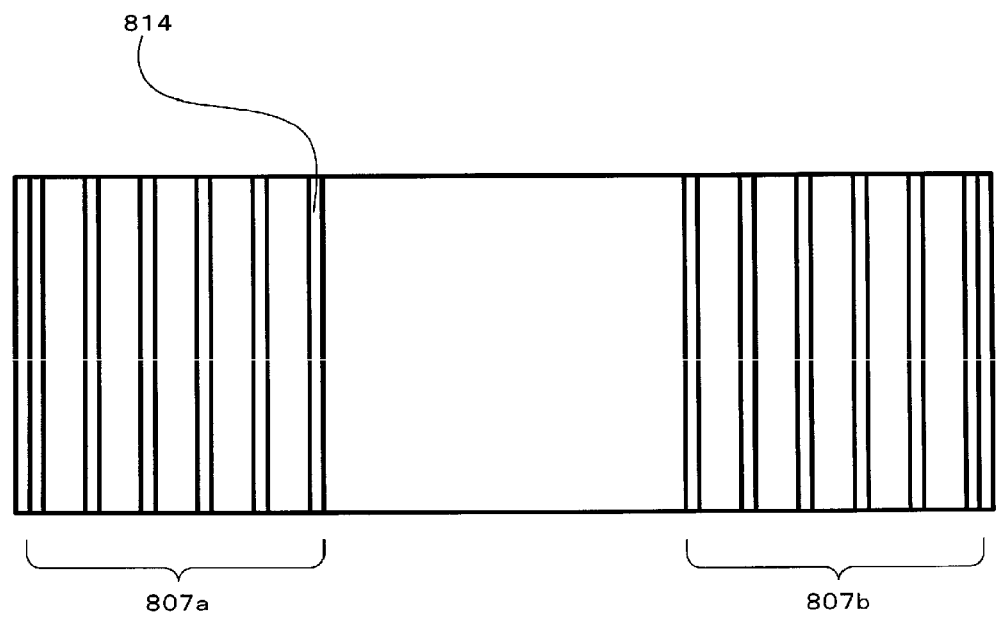

ANTENNA COIL ANTENNA DEVICE

BACKGROUND OF THE INVENTION

1. Field of the Invention

The present invention relates to an antenna coil mounted in an RFID wireless tag, and to an antenna device including the antenna coil.

2. Description of the Related Art

RFID (Radio Frequency Identification Device) systems for performing contactless communication between devices using electromagnetic field signals have been used in various applications. In RFID systems, a magnetic flux generated by causing a current to flow in a transmitter coil produces a change in a magnetic field of a receiver coil to enable the exchange of information between the transmitter coil and the receiver coil.

For example, a system has been developed in which a user holds a mobile phone terminal equipped with an RFID wireless tag, instead of a commuter pass, over an automatic ticket gate of a station to perform communication to exchange user information before the user passes through the gate. In this case, it is easy to supply a current to a coil provided in the automatic ticket gate. Thus, a method in which a current is supplied to the coil provided in the automatic ticket gate to generate a magnetic flux and in which the magnetic flux is caused to pass through a coil axis of a coil of the mobile phone terminal is used. That is, the coil of the automatic ticket gate is a transmitter-side coil, and the coil of the mobile phone terminal is a receiver-side coil.

Another system has been developed in which a user holds a mobile phone terminal over a poster to perform communication to store information contained in the poster in the mobile phone terminal. In this case, it is difficult to supply a current to a coil provided in the poster. Thus, a method in which a current is supplied to a coil of the mobile phone terminal to generate a magnetic flux and in which the magnetic flux is caused to pass through a coil axis of the coil provided in the poster is used. That is, the coil of the mobile phone terminal is a transmitter-side coil, and the coil of the poster is a receiver-side coil.

With the increased number of methods for using RFID systems by using mobile phone terminals, there is an increasing demand for operating antenna coils mounted in the mobile phone terminals not only as receiver coils but also as transmitter coils.

An antenna coil described in PCT Japanese Translation Patent Publication No. 2001-517406 includes a transmitter coil and a receiver coil, which are provided on a single magnetic core. FIG. 11 is a perspective view showing the antenna coil described in PCT Japanese Translation Patent Publication No. 2001-517406. An antenna coil 900 includes a transmitter coil having a first transmitter coil portion 909a and a second transmitter coil portion 909b, and a receiver coil 906 located between the first transmitter coil portion 909a and the second transmitter coil portion 909b so that the transmitter coil and the receiver coil 906 are wound around a magnetic core 902.

When the antenna coil 900 described in PCT Japanese Translation Patent Publication No. 2001-517406 is used in an RFID system which utilizes a mobile phone, the antenna coil 900 is mounted such that a principal surface of the antenna coil 900 and a principal surface of the mobile phone terminal are parallel to each other. A user of the mobile phone terminal usually holds the principal surface of the mobile phone terminal over an external device, and it is necessary to provide superior communication at the principal surface of the antenna coil 900. However, with this use, the antenna coil 900 may not provide superior communication. The reasons therefor will be described below.

In the antenna coil 900, the transmitter coil portions 909a and 909b, and the receiver coil 906 have different directional characteristics. The transmitter coil portions 909a and 909b have opposite winding directions with respect to the coil axis, and each has a directional characteristic of increasing transmission intensity with respect to the direction of the principal surface of the antenna coil 900. The receiver coil 906, on the other hand, is a single coil, and has a directional characteristic of increasing sensitivity with respect to the direction of the coil axis of the antenna coil 900. When using a mobile phone terminal having an RFID transmission and reception function, a user may not change the orientation of the mobile phone terminal between transmission and reception. Therefore, depending on the orientation of the mobile phone terminal, the communication state greatly differs between transmission and reception.

SUMMARY OF THE INVENTION

To overcome the problems described above, preferred embodiments of the present invention provide an antenna coil that is capable of performing high-sensitivity communication with respect to a principal surface direction of the antenna coil in both of a mode in which a receiver coil is in operation and a mode in which a transmitter coil is in operation, and an antenna device including such an antenna coil.

An antenna coil according to a preferred embodiment of the present invention includes a magnetic core, a flexible substrate wound around the magnetic core, conductors provided on the flexible substrate, a receiver coil arranged around the magnetic core and defined by the conductors, the receiver coil being wound so as to be divided into a first receiver coil portion and a second receiver coil portion with a non-coil-wound portion provided therebetween, the second receiver coil portion having an opposite coil winding direction to that of the first receiver coil portion, and a transmitter coil arranged around the magnetic core and defined by the conductors, the transmitter coil being wound so as to be divided into a first transmitter coil portion and a second transmitter coil portion with a non-coil-wound portion therebetween, the second transmitter coil portion having an opposite coil winding direction to that of the first transmitter coil portion, wherein a region in which the receiver coil is provided and a region in which the transmitter coil is provided at least partially overlap each other when viewed in plan view.

Preferably, the conductors defining the receiver coil and the conductors defining the transmitter coil are alternately arranged.

The receiver coil and the transmitter coil are preferably provided on the same surface of the flexible substrate.

Alternatively, the receiver coil and the transmitter coil may preferably be provided in different surfaces of the flexible substrate.

The magnetic core preferably has a bent portion at least at one of the ends thereof in a direction of coil axes of the receiver coil and the transmitter coil and the flexible substrate is preferably wound around a portion of the magnetic core that does not include the bent portion.

The magnetic core is preferably divided, and the first receiver coil portion and the first transmitter coil portion and the second receiver coil portion and the second transmitter coil portion are arranged on different magnetic core portions.

The first receiver coil portion and the second receiver coil portion, or the first transmitter coil portion and the second transmitter coil portion are preferably connected via a plurality of conductors provided on the flexible substrate.

An electrode film that is electrically insulated from the conductors is preferably provided on the flexible substrate.

A composite magnetic material composed of resin and magnetic metal is preferably used for the magnetic core, for example.

An antenna device according to another preferred embodiment of the present invention includes an antenna coil according to a preferred embodiment of the present invention and a circuit substrate on which the antenna coil is mounted.

An antenna device according to another preferred embodiment of the present invention includes the antenna coil having the bent portion described above and a circuit substrate on which the antenna coil is mounted, wherein the bent portion of the magnetic core is arranged along a side surface of the circuit substrate.

A gap is preferably provided between the antenna coil and the circuit substrate, and a surface of the antenna coil on which the electrode film is provided and the circuit substrate face each other.

According to various preferred embodiments of the present invention, a region in which a receiver coil is provided and a region in which a transmitter coil is arranged overlap each other. This enables the receiver coil and the transmitter coil to have substantially the same directional characteristics. Therefore, high-sensitivity communication with respect to the direction of a principal surface of an antenna coil can be achieved in both of a mode in which the receiver coil is in operation and a mode in which the transmitter coil is in operation.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 3A and 3B include plan views showing antenna coils used in Experiment 1.

FIGS. 5A and 5B include plan views showing a flexible substrate according to the second preferred embodiment of the present invention, wherein FIG. 5A shows a front surface of the flexible substrate, and FIG. 5B shows a back surface thereof.

DETAILED DESCRIPTION OF PREFERRED EMBODIMENTS

First Preferred Embodiment

Figure 1:
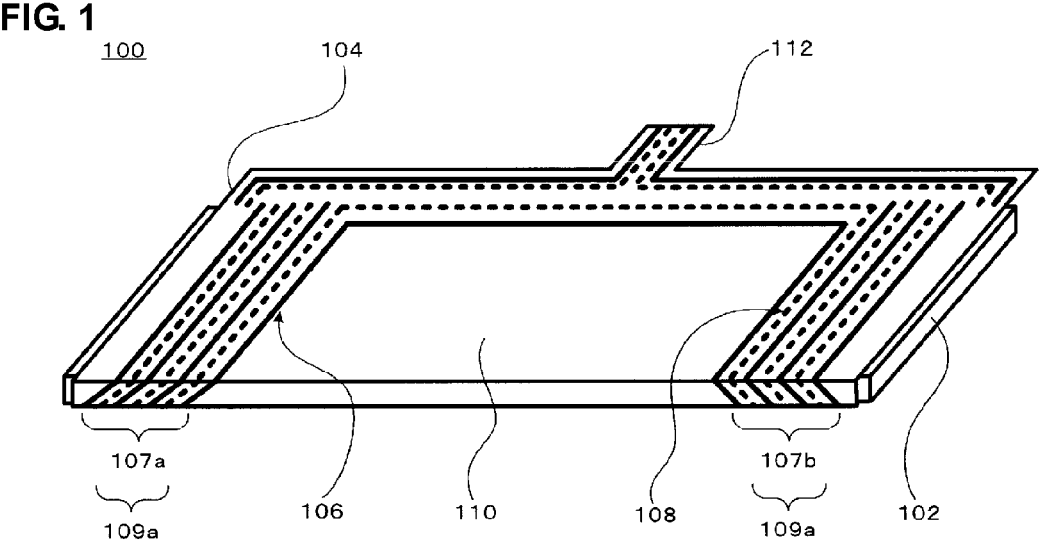
FIG. 1 is a perspective view showing an antenna coil according to a first preferred embodiment of the present invention.
Figure 2:
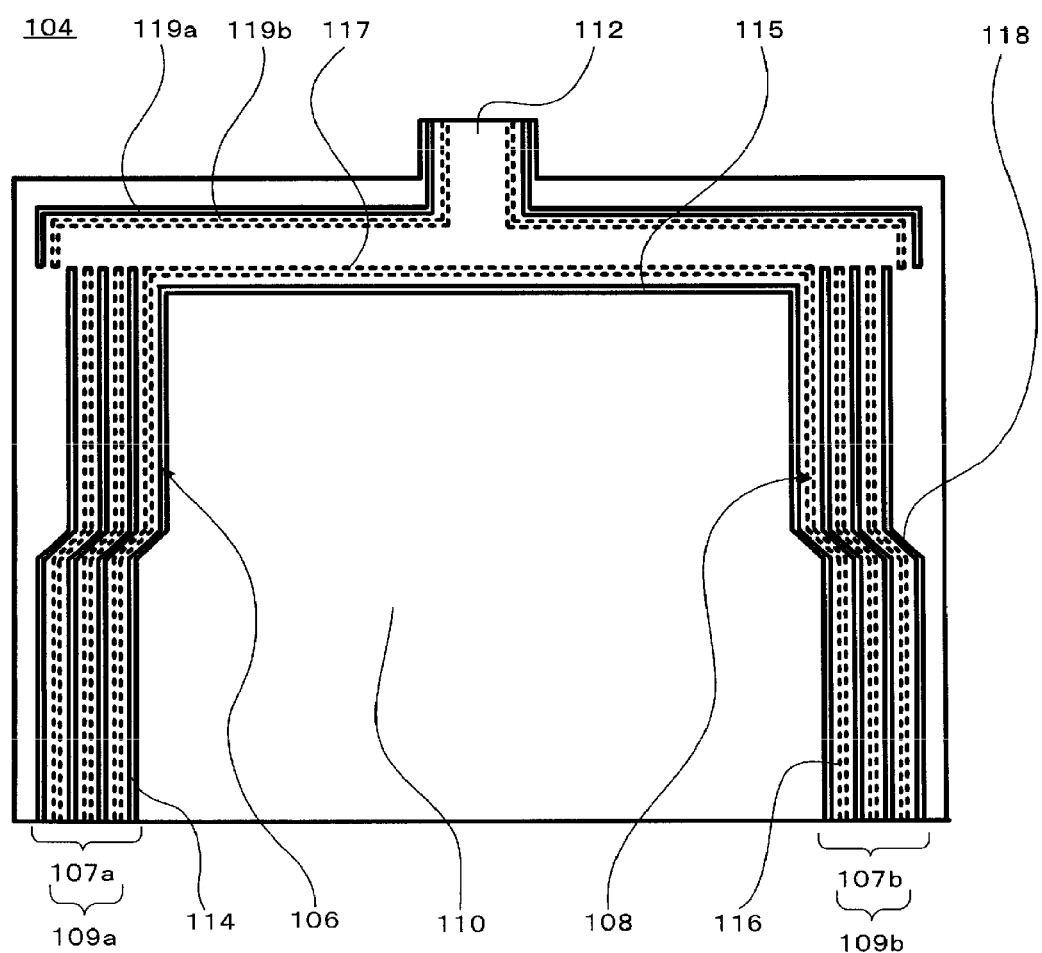
FIG. 2 is a plan view showing a flexible substrate according to the first preferred embodiment of the present invention.

A first preferred embodiment of the present invention will be described with reference to FIG. 1. FIG. 1 is a perspective view showing an antenna coil according to the first preferred embodiment. FIG. 2 is a plan view showing a structure of a flexible substrate according to the first preferred embodiment.

As shown in FIG. 1, an antenna coil 100 according to the first preferred embodiment includes a magnetic core 102 and a flexible substrate 104 wound around the magnetic core 102. The flexible substrate 104 includes conductors provided thereon. The flexible substrate 104 is wound around the magnetic core 102 to connect each of the conductors to another conductor adjacent thereto, and a receiver coil 106 and a transmitter coil 108 which have a common coil axis are thus defined. When the antenna coil 100 is viewed in plan view, a region in which the transmitter coil 108 is provided overlaps a region in which the receiver coil 106 is provided. As described below, for manufacturing purposes, preferably, the flexible substrate 104 is wound around the magnetic core 102 so that a surface in which conductors defining the receiver coil 106 and conductors defining the transmitter coil 108 are provided defines an inside surface. FIG. 1 shows the conductors in a see-through view of the flexible substrate. To facilitate illustration, the conductors defining the receiver coil 106 are indicated by solid lines, and the conductors defining the transmitter coil 108 are indicated by dotted lines. As shown in FIG. 2, the conductors defining the coils 106 and 108 preferably have a constant or substantially constant width. However, in FIG. 1, the conductors are indicated by single lines. The receiver coil 106 is wound so as to be divided into a first receiver coil portion 107a and a second receiver coil portion 107b which have opposite winding directions. A non-coil-wound portion 110 around which no coil conductors are wound is provided between the first receiver coil portion 107a and the second receiver coil portion 107b. The transmitter coil 108 is also divided into a first transmitter coil portion 109a and a second transmitter coil portion 109b which have opposite winding directions. A non-coil-wound portion 110 is provided between the first transmitter coil portion 109a and the second transmitter coil portion 109b. The non-coil-wound portion 110 in the receiver coil 106 and the non-coil-wound portion 110 in the transmitter coil 108 are provided in the same region.

In the first preferred embodiment, a single plate-shaped magnetic core 102 is preferably used. The magnetic core 102 is preferably, for example, a ferrite core having a rectangular principal surface that is about 40 mm long and about 10 mm wide and has a thickness of about 1.5 mm. However, the shape and material of the magnetic core 102 are not limited to those described above, and a composite magnetic member made of resin and magnetic metal may preferably be used. Examples of the composite magnetic member include a member produced by mixing olefin thermoplastic elastomer, maleic acid-modified styrenic thermoplastic elastomer, and magnetic metal such as sendust in a proportion of about 45 percent by volume, about 5 percent by volume, and about 50 percent by volume, respectively, for example. However, the kind and mixture proportion of resin and magnetic metal are not limited to those described above. With the use of such a composite magnetic member, a magnetic core which suffers from less variation of μ with changes of temperature and which is resistant to dropping shock can be achieved.

A foldable electrically insulating film such as a resin film, e.g., a polyimide film or a glass epoxy film, is preferably used as the flexible substrate 104. FIG. 2 shows the flexible substrate 104 before it is wound around the magnetic core 102. The flexible substrate 104 has a projecting portion 112 on an upper-end side surface thereof, which is connected to an input/output terminal (not shown). The projecting portion 112 is not essential, but the projecting portion 112 is preferably provided because the projecting portion 112 facilitates electrical connection with the input/output terminal.

On the surface of the flexible substrate 104, receiver conductors 114 defining the receiver coil 106 and transmitter conductors 116 defining the transmitter coil 108 are preferably alternately arranged on the same surface by screen printing, etching, or other suitable method. As in FIG. 1, the receiver conductors 114 are indicated by solid lines, and the transmitter conductors 116 are indicated by dotted lines. With this structure, a region in which the receiver coil 106 is provided and a region in which the transmitter coil 108 is provided overlap each other. Four receiver conductors 114 are provided on each of two sides, except for a central portion, of the flexible substrate 104, and three transmitter conductors 116 are provided on each of the two sides, except for the central portion. On the left and right outermost sides, the receiver conductors 114 are preferably provided. In the receiver conductors 114, the four conductors provided on the left side define the first receiver coil portion 107a and the four conductors provided on the right side define the second receiver coil portion 107b. It should be noted that the number of conductors can be changed as necessary and the number of conductors mentioned herein is just a non-limiting example.

In addition, in the transmitter conductors 116, the conductors provided on the left side define the first transmitter coil portion 109a and the conductors provided on the right side define the second transmitter coil portion 109b. Since the receiver conductors 114 and the transmitter conductors 116 are provided on two sides, except for the central portion, of the flexible substrate 104, the non-coil-wound portions 110 can be provided between the first receiver coil portion 107a and the second receiver coil portion 107b and between the first transmitter coil portion 109a and the second transmitter coil portion 109b. An external magnetic flux is allowed to enter the non-coil-wound portions 110, or a magnetic flux can be emitted from the non-coil-wound portions 110. Thus, superior communication can be performed at the principal surface of the antenna coil 100 on which the non-coil-wound portions 110 are provided. That is, the antenna coil 100 enables the receiver coil 106 and the transmitter coil 108 to have the same or substantially the same directional characteristics in terms of direction.

Each of the receiver and transmitter conductors 114 and 116 has an angled portion 118 at a central portion thereof. On the principal surface of the flexible substrate 104, the conductors 114 and 116 are arranged so as to contact a lower end of the flexible substrate but not to contact the upper end. The angled portions of the conductors defining the first receiver coil portion 107a and the first transmitter coil portion 109a, and the angled portions of the conductors defining the second receiver coil portion 107b and the second transmitter coil portion 109b are preferably bent in different directions. With this structure, when the flexible substrate 104 is wound around the magnetic core 102, the first receiver coil portion 107a and the second receiver coil portion 107b have opposite coil winding directions, and the first transmitter coil portion 109a and the second transmitter coil portion 109b have opposite coil winding directions. The two innermost conductors of the receiver conductors 114 are connected to each other via a connection conductor 115 in the vicinity of the upper end of the flexible substrate 104. Likewise, the two innermost conductors of the transmitter conductors 116 are connected to each other via a connection conductor 117. Conductors 119a and 119b, which are connected to the input/output terminal, are further provided between upper ends of the conductors 114 and 116 and the flexible substrate 104. The conductors 119a and 119b are arranged so as to extend to an end of the projecting portion 112.

When the flexible substrate 104 is wound around the magnetic core 102, upper ends and lower ends of adjacent receiver conductors 114 sequentially overlap each other, and overlapping points are soldered to thereby define the first receiver coil portion 107a and the second receiver coil portion 107b, and the first receiver coil portion 107a and the second receiver coil portion 107b are connected via the connection conductor 115 to define the receiver coil 106. The first transmitter coil portion 109a and the second transmitter coil portion 109b are defined by the transmission conductors 116 in a manner similar to that described above. The first transmitter coil portion 109a and the second transmitter coil portion 109b are connected via the connection conductor 117 to define the transmitter coil 108. The flexible substrate 104 can preferably be fixedly arranged around the magnetic core 102 by soldering the ends of the conductors 114 and 116. The flexible substrate 104 and the magnetic core 102 are bonded using an adhesive or other suitable bonding agent to ensure a securely fixed arrangement. In the first preferred embodiment, since the receiver conductors 114 and the transmitter conductors 116 are provided on the same surface of the flexible substrate 104, the flexible substrate 104 can preferably be wound around the magnetic core 102 so that the surface in which the receiver conductors 114 and the transmitter conductors 116 are provided on an inside surface. With this winding arrangement, it is easy to solder the ends of the conductors 114 and 116. In addition, the conductors 114 and 116 are not exposed to the outside on the flexible substrate 104, and the conductors 114 and 116 can therefore be prevented from being separated. However, the flexible substrate 104 may be wound so that the surface in which the receiver conductors 114 and the transmitter conductors 116 are provided on an outside surface. In this arrangement, through holes are provided at locations of the flexible substrate 104 at which the conductors are connected, and the conductors are connected by solder filled in the through holes so that the receiver coil 106 and the transmitter coil 108 can be electrically connected.

The operation of the receiver coil 106 and the transmitter coil 108 will be described hereinbelow.

When the receiver coil 106 is in operation, a magnetic flux from an external device enters the non-coil-wound portion 110 provided at the central portion of the antenna coil 100. The entering magnetic flux is forced to change its traveling direction along the shape of the magnetic core 102, and passes through the coil axes of the first and second receiver coil portions 107a and 107b. Then, the magnetic flux is emitted to outside from a side surface of the magnetic core 102. The magnetic flux passes through the coil axes of the first and second receiver coil portions 107a and 107b, thereby inducing a voltage in the receiver coil 106. Since the first receiver coil portion 107a and the second receiver coil portion 107b have opposite coil winding directions, voltages of the same direction are generated even if magnetic fluxes of opposite directions pass through the coil axes of the coil portions 107a and 107b. Thus, a signal can be extracted from the receiver coil 106.

When the transmitter coil 108 is in operation, a voltage is input to the transmitter coil 108 from a terminal (not shown). Due to electromagnetic induction, magnetic fluxes are generated in the first transmitter coil portion 109a and the second transmitter coil portion 109b. Since the first transmitter coil portion 109a and the second transmitter coil portion 109b have opposite coil winding directions, the magnetic fluxes generated in the coil portions 109a and 109b have opposite directions. Such magnetic fluxes are not canceled by each other, and are emitted to outside from the non-coil-wound portions 110 of the magnetic core 102 and again enter the side surface of the magnetic core 102, or are emitted from the side surface of the magnetic core 102 and again enter the non-coil-wound portions 110 of the magnetic core 102.

As described above, since the antenna coil 100 is configured such that the receiver conductors 114 defining the receiver coil 106 and the transmitter conductors 116 defining the transmitter coil 108 are alternately arranged, a region in which the receiver coil 106 is provided and a region in which the transmitter coil 108 is provided overlap each other. With this configuration, the distances and directions from a point located outside the antenna coil 100 to the receiver coil 106 and transmitter coil 108 on the principal surface of the antenna coil 100 are substantially equal to each other. Thus, a mobile phone terminal provided with the antenna coil 100 can perform communication with substantially equal sensitivity for reception and transmission if the mobile phone terminal is located over an external device in the same manner.

The antenna coil 100 switches, using a switching element (not shown) connected to the antenna coil 100, between a mode in which the receiver coil 106 is operated to induce a voltage and a mode in which the transmitter coil 108 is operated to induce a magnetic flux, and controls which mode to operate. In this case, the operation of the receiver coil 106 and the operation of the transmitter coil 108 do not electromagnetically interfere with each other. Results of an experiment performed by the inventors will be shown hereinafter.

Experiment 1

Experiment 1 was performed to investigate whether, in an antenna coil having a receiver coil and a transmitter coil arranged around a single magnetic core, the existence of one of the coils affects the performance of the other coil. To achieve this, measurements were performed to determine whether there was a difference between an antenna coil including a receiver coil and a transmitter coil (hereinafter referred to as an "antenna coil A") and an antenna coil including only a receiver coil (hereinafter referred to as an "antenna coil B") in terms of L-value, Q-factor, coupling coefficient, and communication distance of a receiver coil. FIGS. 3A and 3B include plan views showing the antenna coil A and the antenna coil B. A magnetic core used in the experiment was a ferrite core that was about 40 mm wide, about 10 mm long, and about 1 mm thick, for example. It is assumed that conductors defining the receiver coils and the transmitter coil had a diameter of about 0.2 mm, for example.

The antenna coil A shown in FIG. 3A includes receiver coils 707a and 707b having six turns each at each end of a magnetic core in a transverse direction thereof, and transmitter coils 709a and 709b having three turns each at each end of the magnetic core. To facilitate illustration, the transmitter coils 709a and 709b are indicated by dotted lines. Receiver conductors 714 defining the receiver coils 707a and 707b are located at outermost sides, beginning from which receiver conductors 714 and transmitter conductors 716 are alternately arranged. In portions at which the receiver conductors 714 and the transmitter conductors 716 are alternately arranged, the receiver conductors 714 and the transmitter conductors 716 are spaced at intervals of about 0.3 mm, for example. In portions at which only the receiver conductors 714 are provided, adjacent receiver conductors 714 are spaced at intervals of about 0.8 mm, for example.

The antenna coil B shown in FIG. 3B, on the other hand, includes only receiver coils 807a and 807b having six turns each at each end of a magnetic core in a transverse direction thereof. Adjacent receiver conductors 814 are spaced at intervals of about 0.8 mm, for example.

TABLE 1

|  | antenna coil A | antenna coil B |
| --- | --- | --- |
| L-value | 1.332E−06 | 1.303E−06 |
| Q-factor | 58.1 | 61.2 |
| coupling coefficient | 0.32% | 0.31% |
| communication distance | 123.3 | 122.9 |

Table 1 shows the results of the experiment described above. As shown in Table 1, for all of the L-value, Q-factor, coupling coefficient, and communication distance of the receiver coil, no significant differences were found between the antenna coil A and the antenna coil B. In other words, it was found that the existence of a transmitter coil did not significantly degrade the characteristics of a receiver coil even in an arrangement in which receiver conductors and transmitter conductors are alternately arranged. Therefore, as described above, by switching between a mode in which a receiver coil is in operation and a mode in which a transmitter coil is in operation, one of the receiver coil and the transmitter coil is operated without being affected by the other.

Further, in this preferred embodiment, a conducting wire is not wound around the magnetic core 102, but instead, the flexible substrate 104 having conductors provided thereon is wound around the magnetic core 102 to define the receiver coil 106 and the transmitter coil 108. The receiver coil 106 and the transmitter coil 108 can be formed at the same time, and the number of manufacturing steps can therefore be reduced.

In this preferred embodiment, the receiver conductors 114 and the transmitter conductors 116 are alternately arranged. However, the receiver conductors 114 and the transmitter conductors 116 may not necessarily be alternately arranged because the directional characteristics of the receiver coil 106 and the transmitter coil 108 can be made similar to each other as long as a region in which the receiver coil 106 is provided and a region in which the transmitter coil 108 is provided at least partially overlap each other when viewed in plan view. Furthermore, in this preferred embodiment, the first receiver coil portion 107a and the second receiver coil portion 107b are connected in series and the first transmitter coil portion 109a and the second transmitter coil portion 109b are connected in series. However, the present invention includes a preferred embodiment in which the first receiver coil portion 107a and the second receiver coil portion 107b are connected in parallel and in which the first transmitter coil portion 109a and the second transmitter coil portion 109b are connected in parallel.

Second Preferred Embodiment

Figure 4:
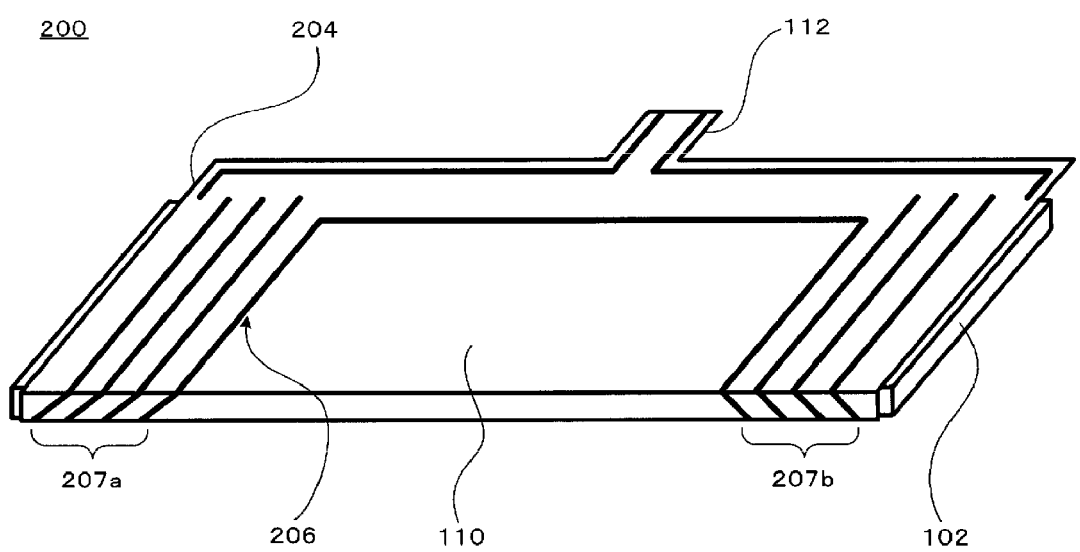
FIG. 4 is a perspective view showing an antenna coil according to a second preferred embodiment of the present invention.
Figure 5A:
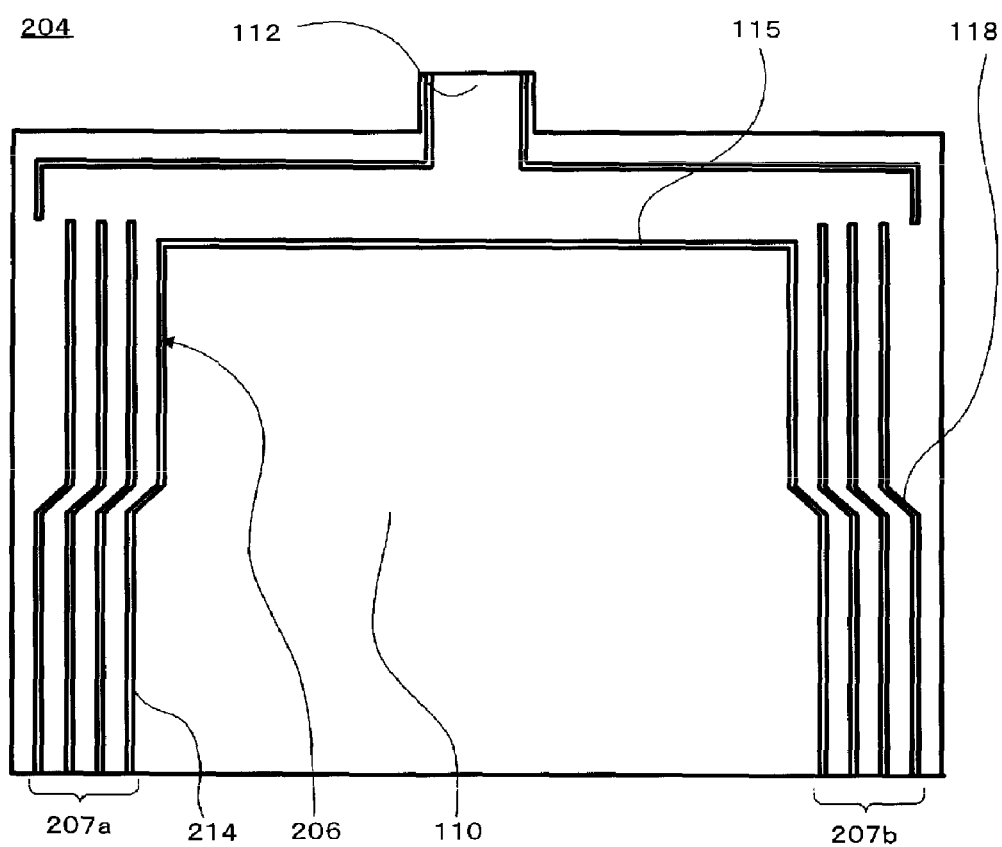
Figure 5B:
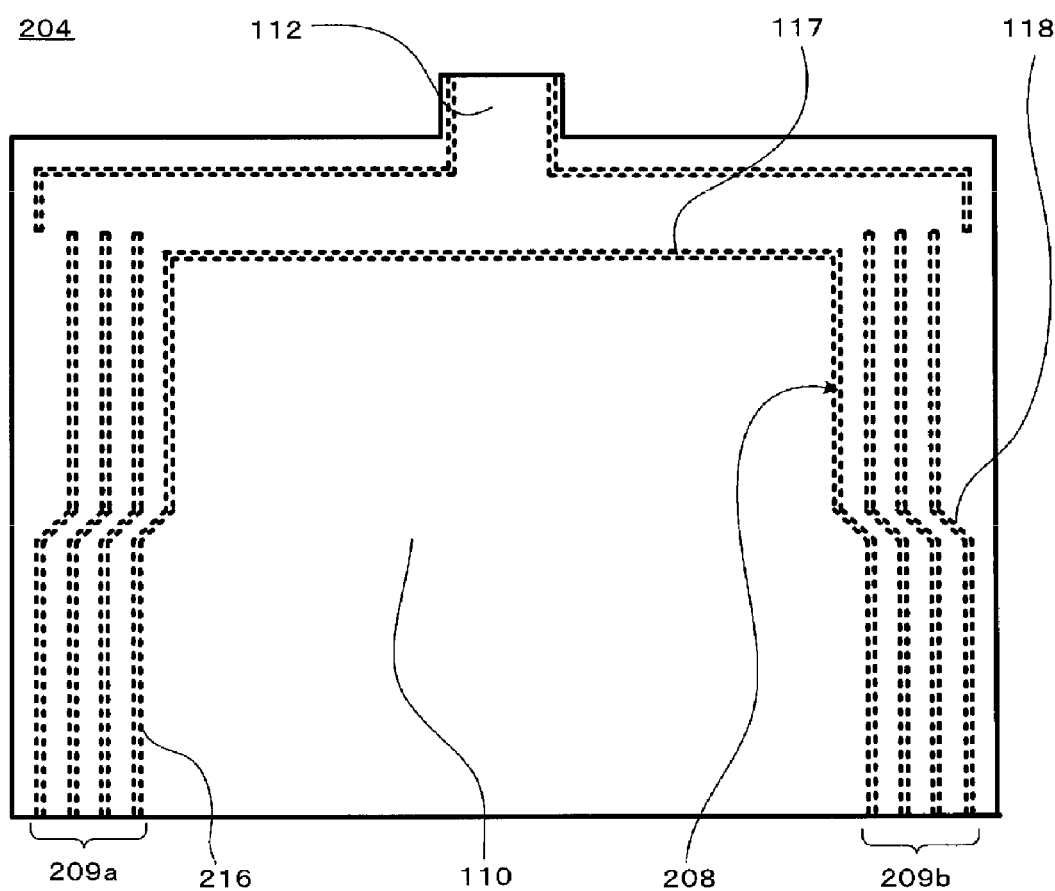

A second preferred embodiment of the present invention will be described with reference to FIGS. 4, 5A and 5B. FIG. 4 is a perspective view showing an antenna coil according to the second preferred embodiment. FIGS. 5A and 5B include plan views showing a structure of a flexible substrate according to the second preferred embodiment. FIG. 5A shows a front surface of the flexible substrate, and FIG. 5B shows a back surface thereof. The same elements as those of the first preferred embodiment are denoted by the same reference numerals and a description thereof is omitted.

As shown in FIG. 4, an antenna coil 200 according to the second preferred embodiment includes a magnetic core 102 and a flexible substrate 204 wound around the magnetic core 102. A difference from the first preferred embodiment is that a receiver coil 206 and a transmitter coil are provided on different surfaces of the flexible substrate 204, wherein the receiver coil 206 is provided on an outside surface of the flexible substrate 204 and the transmitter coil is provided on an inside surface thereof. Furthermore, receiver conductors 214 defining the receiver coil 206 and transmitter conductors defining the transmitter coil are not alternately arranged but overlap each other with the flexible substrate 204 therebetween.

FIGS. 5A and 5B show the flexible substrate 104 according to the second preferred embodiment before it is wound around the magnetic core 102. On the front surface shown in FIG. 5A, the receiver conductors 214 defining the receiver coil 206 are provided. On the back surface shown in FIG. 5B, transmitter conductors 216 defining a transmitter coil 208 are provided. Four transmitter conductors 216 are also provided on each side, except for a central portion.

With this structure, a region in which the receiver coil 206 is provided and a region in which the transmitter coil 208 is provided completely overlap each other. Thus, superior communication can be performed when the antenna coil 200 is used as either a receiver coil or a transmitter coil. In the second preferred embodiment, the number of receiver conductors 214 and the number of transmitter conductors 216 are preferably equal to each other. However, the present invention is not limited to this preferred embodiment. That is, the number of receiver conductors 214 may be greater than the number of transmitter conductors 216. In this case, the L-value of the receiver coil 206 can be greater than the L-value of the transmitter coil 208 while the directional characteristic of the receiver coil 206 and the directional characteristic of the transmitter coil 208 are equal or substantially equal. Since a magnetic flux which is not necessarily large needs to be captured to efficiently induce a voltage which is large, the number of turns of the receiver coil 206 is preferably greater than that of the transmitter coil 208.

Third Preferred Embodiment

Figure 6:
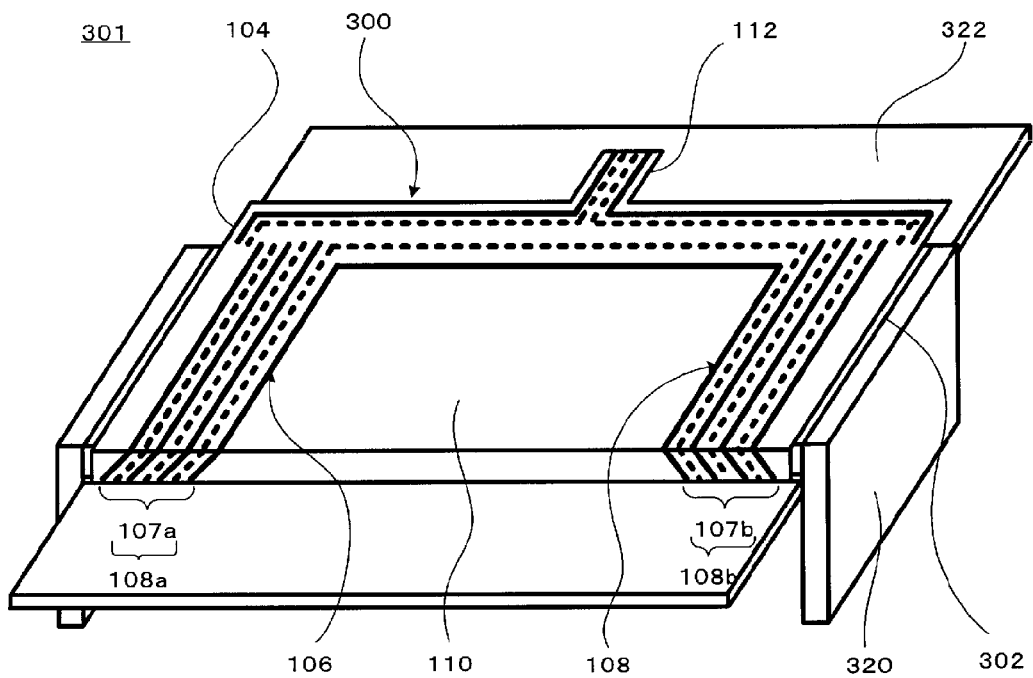
FIG. 6 is a perspective view showing an antenna coil according to a third preferred embodiment of the present invention.

A third preferred embodiment of the present invention will be described with reference to FIG. 6. FIG. 6 is a perspective view showing an antenna device according to the third preferred embodiment. The same elements as those of the first preferred embodiment are denoted by the same numerals and a description thereof is omitted.

As shown in FIG. 6, an antenna device 301 according to the third preferred embodiment includes a circuit substrate 322 and an antenna coil 300 mounted on the circuit substrate 322. In the antenna device 301, a principal surface of the circuit substrate 322 and a principal surface of the antenna coil 300 face each other and are closely adhered to each other.

The antenna coil 300 includes a magnetic core 302 and a flexible substrate 104 wound around the magnetic core 302. The magnetic core 302 has, at both ends thereof, bent portions 320 having a rectangular parallelepiped shape. The bent portions 320 are bent in a direction along side surfaces of the circuit substrate 322, and are arranged so as to sandwich the magnetic core 302 therebetween. In the third preferred embodiment, the bent portions 320 are preferably configured so as to have a rectangular or substantially rectangular parallelepiped shape. However, the shape of bent portions is not limited to that described above, and bent portions may be formed by, for example, curving both ends of the magnetic core 302 so that the ends of the magnetic core 302 are not bent at a right angle. A magnetic core having bent portions may be integrally formed, or separate bent portions may be added to a magnetic core.

In the antenna device 301, the principal surface of the circuit substrate 322 and the principal surface of the antenna coil 300 face each other and are closely adhered to each other. Thus, when the antenna coil 300 is operating as a receiver coil, a magnetic flux entering a non-coil-wound portion 110 travels in accordance with the shape of the magnetic core 302 and is prevented from traveling by the circuit substrate 322, which is electrically conductive, and the direction in which the magnetic flux travels is changed. Therefore, the amount of magnetic flux passing through the coil axes of first receiver coil portions 107a and 107b is greater than that of the antenna coil 100 of the first preferred embodiment. In addition, when the antenna coil 300 is operating as a transmitter coil, a magnetic flux passes through a similar flow path, and a sufficient amount of magnetic flux can be supplied to a transmission destination.

In the antenna coil 300, since the magnetic core 302 has the bent portions 320 at either end thereof, cross sections of ends of the magnetic core 302, which are perpendicular or substantially perpendicular to the principal surface of the magnetic core 302, have a relatively large area. This reduces magnetic resistance at the ends of the magnetic core 302 and makes it easier for a magnetic flux to pass within the magnetic core 302. Furthermore, in the antenna device 301, end surfaces of the bent portions 320 of the antenna coil 300 are not located on the circuit substrate 322 but are located outside the circuit substrate 322 when viewed in plan view. Thus, the magnetic flux is emitted from an overall surface of the bent portions including the end surfaces thereof. This provides very high emission efficiency of magnetic flux and makes it easier for the magnetic flux to pass within the magnetic core 302. As the amount of magnetic flux passing within the magnetic core 302 increases, a voltage induced by a receiver coil 106 increases when the antenna coil 300 is operating as a receiver coil, and a larger signal can be extracted. When the antenna coil 300 is operating as a transmitter coil, on the other hand, the amount of magnetic flux emitted from a transmitter coil 108 increases, and a large voltage can be generated at an antenna of a transmission destination. Therefore, high-sensitivity communication can be achieved when the antenna device 301 is operating as either a receiver or a transmitter.

Fourth Preferred Embodiment

Figure 7:
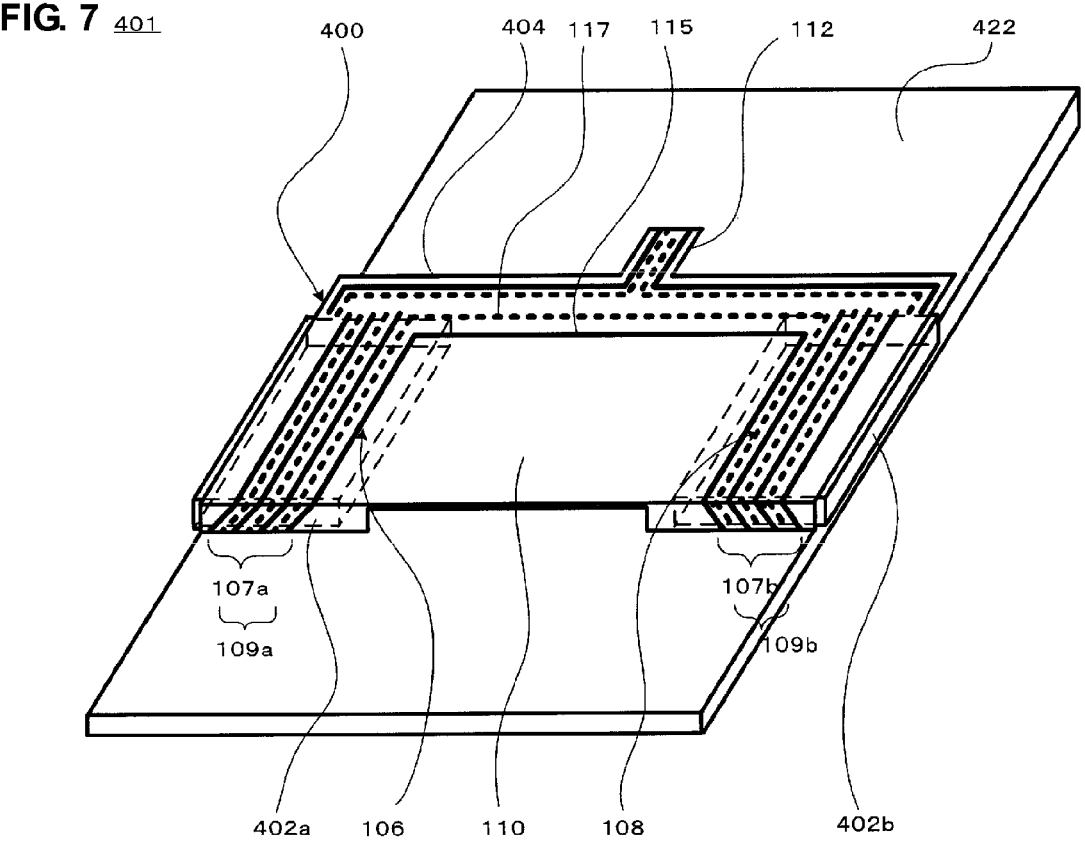
FIG. 7 is a perspective view showing an antenna coil according to a fourth preferred embodiment of the present invention.
Figure 8:
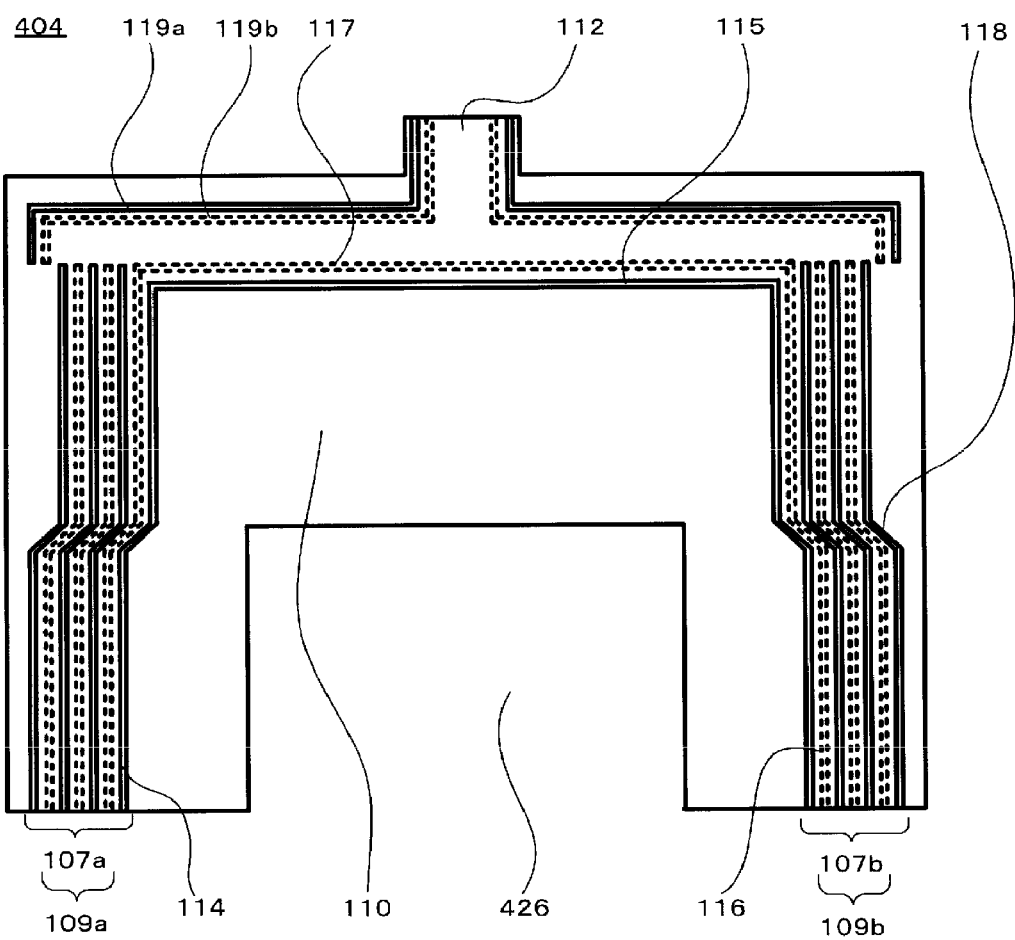
FIG. 8 is a plan view showing a flexible substrate according to the fourth preferred embodiment of the present invention.

A fourth preferred embodiment of the present invention will be described with reference to FIGS. 7 and 8. FIG. 7 is a perspective view showing an antenna device according to the fourth preferred embodiment. FIG. 8 is a plan view showing a flexible substrate according to the fourth preferred embodiment.

As shown in FIG. 7, an antenna device 401 according to the fourth preferred embodiment includes a circuit substrate 422 and an antenna coil 400 mounted in close contact on the circuit substrate 422. The antenna coil 400 includes a first magnetic core 402a, a second magnetic core 402b, and a single flexible substrate 404 wound around the first and second magnetic cores 402a and 402b. Conductors provided on the flexible substrate 404 define a first receiver coil portion 107a and a first transmitter coil portion 109a around the first magnetic core 402a, and a second receiver coil portion 107b and a second transmitter coil portion 109b around the second magnetic core 402b. The first receiver coil portion 107a and the second receiver coil portion 107b, and the first transmitter coil portion 109a and the second transmitter coil portion 109b are connected via connection conductors 115 and 117 provided on the flexible substrate 404, respectively.

FIG. 8 shows the flexible substrate 404. When viewed in plan view, the flexible substrate 404 according to the fourth preferred embodiment has a projecting portion 112 on a side of a rectangular or substantially rectangular shape thereof, which is connected to an input/output terminal. A cutout portion 426 is provided in a side facing the side on which the projecting portion 112 is provided. Receiver conductors 114 and transmitter conductors 116 are provided in the same or similar manner to that of the first preferred embodiment.

When the flexible substrate 404 having the above structure is wound around the first magnetic core 402a and the second magnetic core 402b, a gap is provided between the circuit substrate 422 and the antenna coil 400 by the cutout portion 426 provided in the flexible substrate 404. That is, a principal surface of the antenna coil 400 does not entirely come into contact with a principal surface of the circuit substrate 422, and a hollow space is provided between the first magnetic core 402a and the second magnetic core 402b. Such a partially hollow space may preferably accommodate a component other than the antenna coil 400, and the space can therefore be effectively utilized.

Even when a magnetic core is divided into the first magnetic core 402a and the second magnetic core 402b, no deterioration occurs in the receiving sensitivity of the antenna coil 400. A magnetic flux entering a non-coil-wound portion 110 of the antenna coil 400 is prevented from traveling by the circuit substrate 422 located behind the antenna coil 400, and enters the first magnetic core 402a and the second magnetic core 402b. The magnetic flux entering the first magnetic core 402a passes through the coil axes of the first receiver coil portion 107a and the first transmitter coil portion 109a, and the magnetic flux entering the second magnetic core 402b passes through the coil axes of the second receiver coil portion 107b and the second transmitter coil portion 109b. A voltage is induced in a receiver coil 106 and a transmitter coil 107. The same applies to the transmission sensitivity of the antenna coil 400.

Fifth Preferred Embodiment

Figure 9:
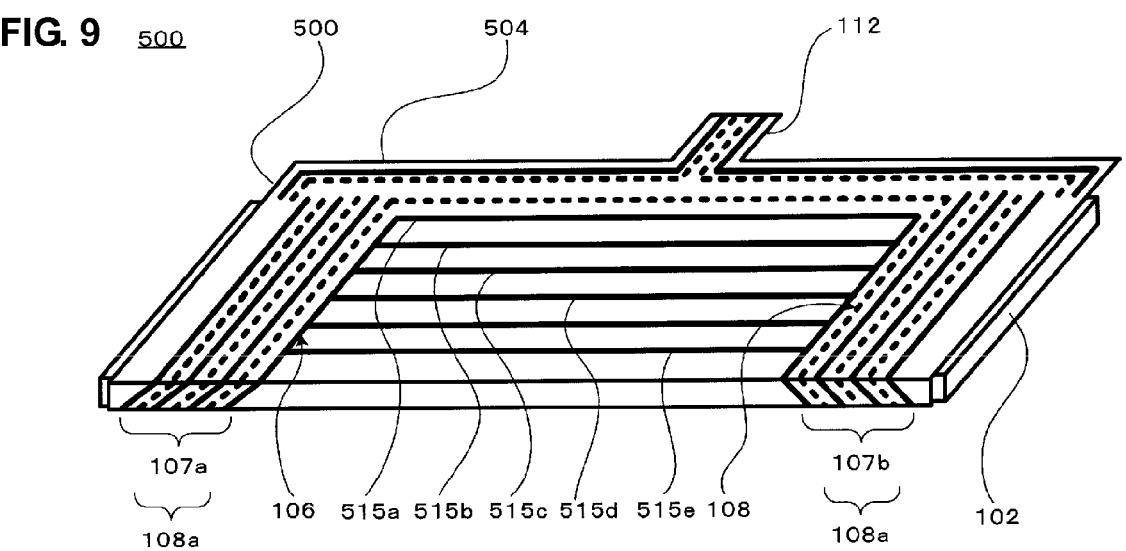
FIG. 9 is a perspective view showing an antenna coil according to a fifth preferred embodiment of the present invention.

A fifth preferred embodiment of the present invention will be described with reference to FIG. 9. FIG. 9 is a perspective view showing an antenna coil according to the fifth preferred embodiment. Elements having the same or substantially the same structure as that of the first preferred embodiment are denoted by the same numerals and a description thereof is omitted.

As shown in FIG. 9, an antenna coil 500 according to the fifth preferred embodiment includes magnetic core 102 and a flexible substrate 504 wound around the magnetic core 102. A difference from the first preferred embodiment is that a plurality of connection conductors 515a, 515b, 515c, 515d, and 515e arranged to connect a first receiver coil portion 107a and a second receiver coil portion 107b in a receiver coil 106 are provided.

In the antenna coil 500, the five connection conductors 515a, 515b, 515c, 515d, and 515e arranged to connect the first receiver coil portion 107a and the second receiver coil portion 107b are provided on the flexible substrate 504. The five connection conductors can provide five paths through which current flows, and one of the paths is selected to adjust an inductance value of the antenna coil 500.

For example, when the connection conductors 515b, 515c, 515d, and 515e are disconnected, the path of current is through the connection conductor 515a, and the length of conductors defining the first receiver coil portion 107a and the second receiver coil portion 107b is maximized. When the connection conductors 515a, 515b, 515c, and 515d are disconnected, on the other hand, the path of current is through the connection conductor 515e, and the length of conductors defining the first receiver coil portion 107a and the second receiver coil portion 107b is minimized. Depending on the length of conductors defining the coil portions 107a and 107b, an inductance value of the receiver coil is changed, and a resonant frequency of a resonant circuit that is formed by the receiver coil 106 and a capacitor can be adjusted. In the receiver coil 106, a voltage is induced by a change in magnetic flux passing through the coil portions 107a and 107b regardless of the resonant frequency. When the resonant frequency and the frequency of the incoming magnetic flux coincide with each other, a particularly large voltage is induced. By adjusting the resonant frequency of the resonant circuit to a desired value, the voltage is increased and communication sensitivity of an antenna is improved. In the antenna coil 500, the inductance value can be selected after the antenna coil 500 is manufactured. Therefore, the communication sensitivity of the antenna can be easily and significantly improved.

In this preferred embodiment, a plurality of connection conductors for the receiver coil 106 are preferably provided. However, a plurality of connection conductors may be provided for the transmitter coil 108. Further, a plurality of connection conductors may be provided for each of the receiver coil 106 and the transmitter coil 108.

Sixth Preferred Embodiment

Figure 10:
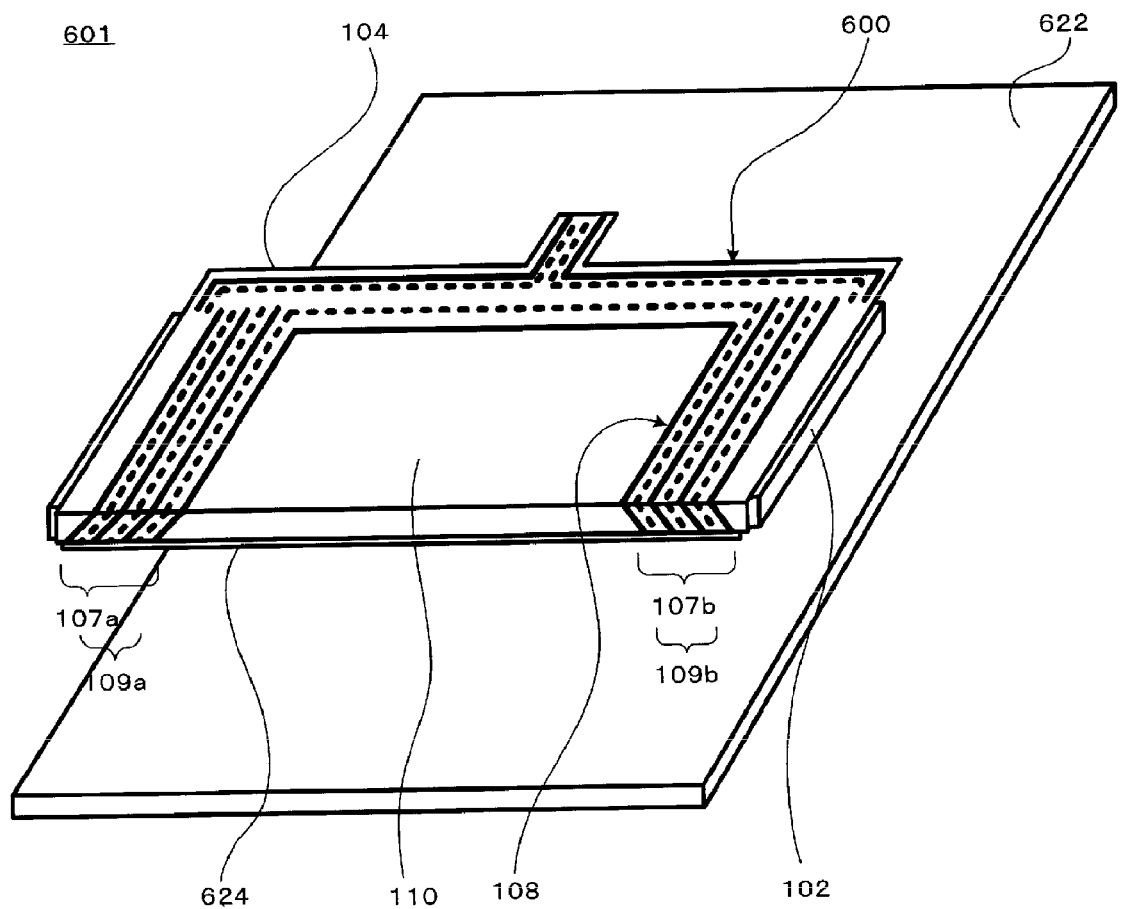
FIG. 10 is a perspective view showing an antenna coil according to a sixth preferred embodiment of the present invention.
Figure 11:
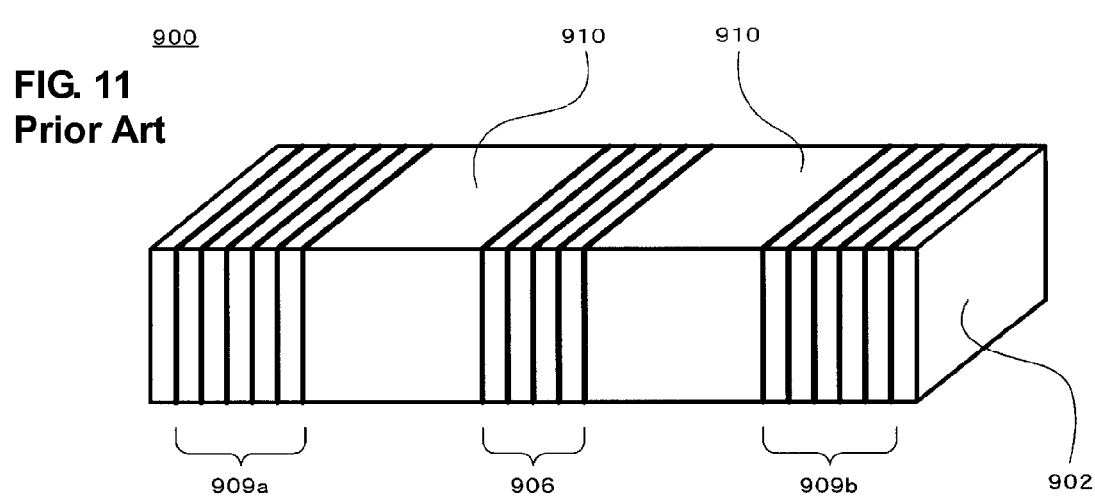
FIG. 11 is a perspective view showing a structure of an antenna coil of the related art.

A sixth preferred embodiment of the present invention will be described with reference to FIG. 10. FIG. 10 is a perspective view showing an antenna device according to the sixth preferred embodiment.

As shown in FIG. 10, an antenna device 601 according to the sixth preferred embodiment includes a circuit substrate 622 and an antenna coil 600 mounted on the circuit substrate 622. The antenna device 601 is provided with a gap between the antenna coil 600 and the circuit substrate 622. The gap may be provided between the antenna coil 600 and the circuit substrate 622 by, for example, fixing the antenna coil 600 to a housing of a mobile phone terminal (not shown). The gap may accommodate a circuit component other than the antenna coil 600, and the flexibility of utilizing a space within the housing in which the antenna device 601 is mounted is therefore increased. An electrode film 624 is provided on a surface of the antenna coil 600 that faces the circuit substrate 624. The electrode film 624 is arranged so as to entirely or substantially entirely cover the surface of the antenna coil 600 that faces the circuit substrate 622. The electrode film 624 is formed after a receiver coil 106 and a transmitter coil 108 are coated with a non-conductive adhesive so that the electrode film 624 may not be electrically connected to the receiver coil 106 and the transmitter coil 108.

The antenna device 601 is provided with the gap between the antenna coil 600 and the circuit substrate 622. Thus, when the antenna coil 600 is operating as a receiver coil, a magnetic flux coming from above the antenna coil 600 and entering a non-coil-wound portion of the antenna coil 600 may not be bent in accordance with the shape of the magnetic core 102 but may travel in a straight line. The magnetic flux traveling along such a path does not pass through coil axes of a first receiver coil portion 107*a* and a second receiver coil portion 107*b*, and no voltage is induced in the receiver coil. However, since the antenna coil 600 includes the electrode film 624 on the surface thereof that faces the circuit substrate 622, there is no possibility that the magnetic flux entering the non-coil-wound portion travels in a straight line. Therefore, even with the gap provided between the antenna coil 600 and the circuit substrate 622, the magnetic flux can be guided to the first receiver coil portion 107*a* and the second receiver coil portion 107*b*, and superior communication can be performed.

Furthermore, when the antenna coil 600 is operating as a transmitter coil, a voltage is input to the transmitter coil 108, and magnetic fluxes generated from a first transmitter coil portion 109*a* and a second transmitter coil portion 109*b* are prevented from traveling by the electrode film 624 provided on the surface of the antenna coil 600 that faces the circuit substrate 622, and are bent in a direction opposite to the circuit substrate 622. Therefore, a magnetic flux can be supplied to a coil provided in a communication destination device, which is located on the side opposite to the circuit substrate, and superior communication can be performed even when the antenna coil 600 is operating as a transmitter coil.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An antenna coil comprising:
   a magnetic core;
   a substrate wound around the magnetic core;
   conductors provided on the substrate;
   a receiver coil arranged around the magnetic core and defined by the conductors, the receiver coil being wound so as to be divided into a first receiver coil portion and a second receiver coil portion with a non-coil-wound portion provided therebetween, the second receiver coil portion having an opposite coil winding direction of coil winding to that of the first receiver coil portion; and
   a transmitter coil arranged around the magnetic core and defined by the conductors and having a coil axis parallel or substantially parallel to a coil axis of the receiver coil, the transmitter coil being wound so as to be divided into a first transmitter coil portion and a second transmitter coil portion with a non-coil-wound portion therebetween, the second transmitter coil portion having an opposite coil winding direction to that of the first transmitter coil portion; wherein
   a region in which the receiver coil is provided and a region in which the transmitter coil is provided at least partially overlap each other when viewed in plan view.

2. The antenna coil according to claim 1, wherein the conductors defining the receiver coil and the conductors defining the transmitter coil are alternately arranged.

3. The antenna coil according to claim 1, wherein the receiver coil and the transmitter coil are provided on the same surface of the substrate.

4. The antenna coil according to claim 1, wherein the receiver coil and the transmitter coil are provided on different surfaces of the substrate.

5. The antenna coil according to claim 1, wherein
   the magnetic core includes a bent portion at least at one end thereof in a direction of the coil axes of the receiver coil and the transmitter coil; and
   the substrate is wound around a portion of the magnetic core that does not include the bent portion.

6. The antenna coil according to claim 1, wherein the magnetic core is divided into different magnetic core portions, and the first receiver coil portion and the first transmitter coil portion and the second receiver coil portion and the second transmitter coil portion are arranged on the different magnetic core portions.

7. The antenna coil according to claim 1, wherein at least one of a set of the first receiver coil portion and the second receiver coil portion and a set of the first transmitter coil portion and the second transmitter coil portion is connected via a plurality of conductors provided on the substrate.

8. The antenna coil according to claim 1, wherein an electrode film electrically insulated from the conductors is provided on the substrate.

9. The antenna coil according to claim 1, wherein a composite magnetic material composed of resin and magnetic metal is used for the magnetic core.

10. An antenna device comprising:
    the antenna coil according to claim 1; and
    a circuit substrate on which the antenna coil is mounted.

11. An antenna device comprising:
    the antenna coil according to claim 5; and
    a circuit substrate on which the antenna coil is mounted; wherein
    the bent portion of the magnetic core is arranged along a side surface of the circuit substrate.

12. An antenna device comprising:
    the antenna coil according to claim 8; and
    a circuit substrate on which the antenna coil is mounted; wherein
    a gap is provided between the antenna coil and the circuit substrate; and
    a surface of the antenna coil on which the electrode film is provided and the circuit substrate face each other.

13. The antenna coil according to claim 1, wherein the substrate is made of a flexible material.

\* \* \* \* \*